(No Model.)　　　　　　　　W. A. WOODS.　　　　2 Sheets—Sheet 1.
BARK MILL.

No. 329,113.　　　　　　　　　　Patented Oct. 27, 1885.

Witnesses,　　　　　　　　　　　　　　Inventor,
　　　　　　　　　　　　　　　　　　　W. A. Woods
　　　　　　　　　　　　　　　　　　　Dewey & Co.
　　　　　　　　　　　　　　　　　　　Attorneys N. PETERS, Photo-Lithographer, Washington, D. C.

UNITED STATES PATENT OFFICE.

WILLIAM A. WOODS, OF SANTA CRUZ, CALIFORNIA, ASSIGNOR TO R. C. KIRBY, OF SAME PLACE.

BARK-MILL.

SPECIFICATION forming part of Letters Patent No. 329,113, dated October 27, 1885.

Application filed February 26, 1885. Serial No. 157,128. (No model.)

*To all whom it may concern:*

Be it known that I, WILLIAM A. WOODS, of Santa Cruz, in the county of Santa Cruz and State of California, have invented an Improvement in Bark-Mills; and I hereby declare the following to be a full, clear, and exact description thereof.

My invention relates to a new and useful mill for cutting bark; and the mill embodies a two-part hinged casing or shell having an open bottom, a peculiarly-located hopper let into the casing near its top or to one side of its vertical center, a rotating open-ended cutter-head or drum mounted in the casing and provided with adjustable bits or knives adapted to catch and slice the bark between themselves and the lower or long wall of the hopper and to force the cut slice into the drum, and peculiar inclined ejector-wings on the periphery of the cutter-head or drum, adapted to force the cut or sliced bark outwardly to the open ends of the drum, from which it falls into the casing and is discharged, all of which, together with several details of construction, I shall hereinafter fully claim and explain by reference to the accompanying drawings, in which—

Figure 1:
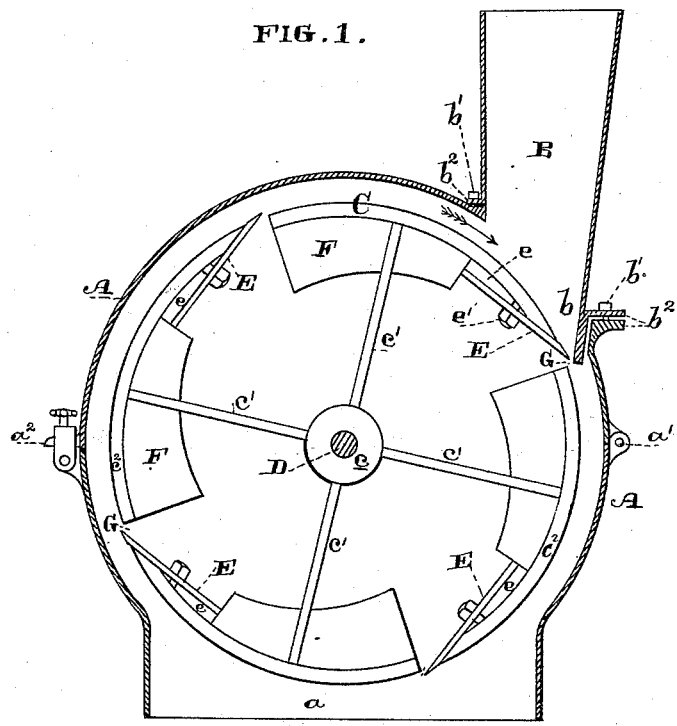
Figure 2:
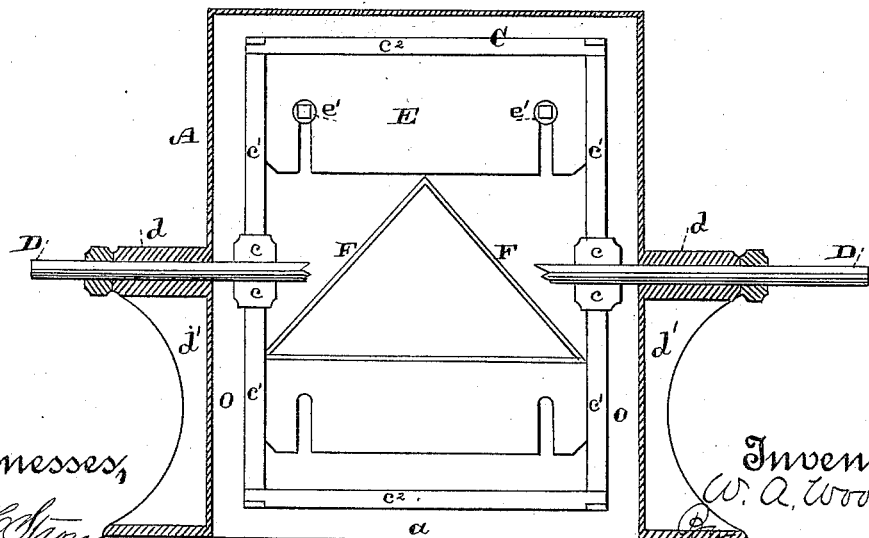
Figure 3:
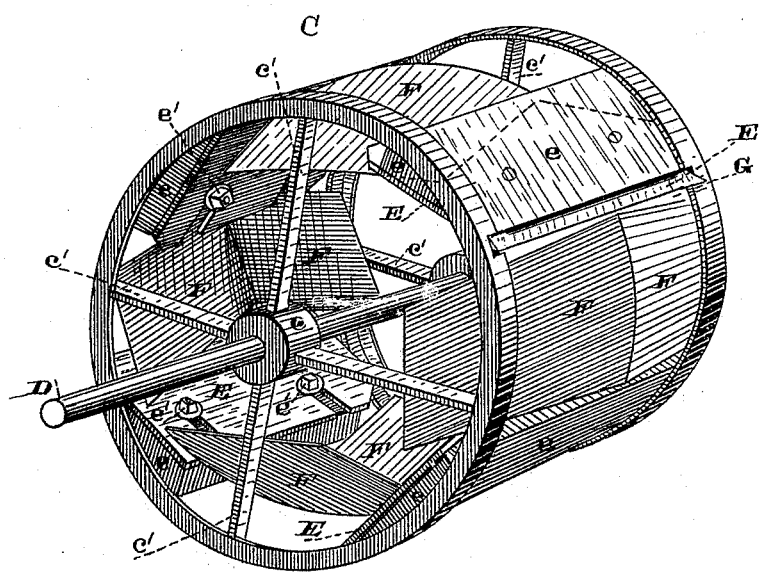

Figure 1 is a vertical part section of my mill. Fig. 2 is a vertical longitudinal section of same. Fig. 3 is a perspective of the cutter-head or drum C with the segmental bands removed, and showing the angular wings F.

A is a cylindrical casing or shell, the bottom $a$ of which is open and forms the discharge-aperture. The casing is constructed in two parts, hinged at one side at $a'$, and secured at the other side by a latch, $a^2$, whereby the top may be thrown back to permit access to the interior. Into the casing, near its top and to one side of the plane of the vertical center thereof, is let a hopper, B, the short or upper wall of which terminates with the casing and its long or lower wall projects within it a short distance, as shown at $b$. The hopper is mounted on small ledges $b^2$, projecting from the casing and the hopper, and is adapted to be vertically adjusted toward or from the cutter-head by means of cap-screws $b'$.

C is the cutter-head or drum, consisting of hubs $c$, radial arms $c'$, and peripheral segmental bands $c^2$. The drum is open-ended, and is mounted on a shaft, D, journaled in suitable bearings, $d$, on brackets $d'$, and passing through the sides of the casing or shell.

Secured to lugs $e$, cast on the bands $c^2$ of the drum, are the knives or bits E, which may be adjusted by means of bolts $e'$ passing through slots in the knives and into the lugs. The cutting-edges or outer ends of the knives project slightly beyond the periphery of the drum, and in the rotation of said drum are adapted to pass in approximate relation to the long or lower wall of the hopper. This relation may be made closer or more distant by adjusting the knives on their bolts, as previously described.

Secured to or cast with the inner surface of the segmental bands $c^2$ of the drum are the pieces F, having inclined sides, as shown in Figs. 2 and 3, and which form the ejector-wings. Between the front of the bits and the rear of the preceding wings are the spaces G, into which the cut bark is forced, and between the casing and the ends of the drum are spaces $o$, communicating with the bottom discharge, $a$.

The operation of the mill is as follows: The bark is placed in hopper B, the lower end of which rests, as before described, in close relation with the periphery of the drum C, through which the knives or bits E project. As the drum revolves in the direction indicated by the arrow, the bits are brought into contact with the bark, forcing it against the lower wall of the hopper at $b$, causing a portion of it to be cut away by each successive bit equal to its projection from the outer surface of the drum. The slice thus cut is forced through the opening G, and, meeting the inclined surfaces of the succeeding wing or ejector F, is forced thereby to the open ends of the drum, and thence into the spaces $o$ between the drum and casing, where it drops through the bottom opening of the casing. The thickness of the slice of bark cut is regulated by projecting the bits more or less, as the case may be. The hopper itself is regulated vertically by the cap-bolts $b'$. By opening the shell or casing access may be readily had to the bits for the purpose of adjusting them, or removing them when required for grinding. By this location of the hopper above and to one side of the drum any form of bark will be drawn into the machine automatically. The hopper may be increased in height without necessarily increasing the diameter of the drum.

Having thus described my invention, what I claim as new, and desire to secure by Letters Patent, is—

1. In a bark-mill, a rotating cylindrical cutter-head having the segmental bands $c^2$, radial arms $c'$, and a series of knives or bits secured to the inner surface of its periphery, and projecting beyond and intersecting the periphery at a slight angle, in combination with an adjustable hopper supported above and to one side of the vertical plane of the cutter-head, and having one of its walls projected approximately tangential and nearly to the periphery of the cutter-head, whereby the knives are adapted to slice the bark between themselves and said wall, substantially as herein described.

2. In a bark-mill, the two-part or hinged casing or shell A, and the adjustable hopper B, communicating therewith at one side of its vertical center, the lower wall of said hopper projecting within the casing, in combination with the rotating drum or cutter-head C, having adjustable knives or bits E, extending beyond its periphery and adapted to be brought into a more or less close relation with the projecting wall of the hopper, substantially as and for the purpose herein described.

3. In a bark-mill, the casing or shell A, and the vertically-adjustable hopper B, communicating with the shell to one side of its vertical center, and having its lower wall projecting therein, in combination with the rotating drum or cutter-head C, having adjustable bits or knives E, adapted to cut the bark between themselves and the projecting wall of the hopper, substantially as herein described.

4. In a bark-mill, the casing or shell A, and hopper B, having its lower wall projecting within the casing, as described, in combination with the rotating cutter-head or hollow drum C, the bits or knives E on its periphery, and the angled or sloping ejector-wings F on the inner surface of the periphery of the drum, and alternating with the knives or bits, spaces being left between the cutting-edges of the knives and the rear of the precedings wings, substantially as and for the purpose herein described.

5. In a bark-mill, the casing or shell A, having an open bottom, and the hopper B, having an inwardly-projecting wall, as described, in combination with the open-ended hollow drum C, mounted and rotated within the casing, and of less length than said casing, the knives or bits E on the periphery of the drum, and the angled or sloping ejector-wings F on the inner surface of the periphery of said drum, and alternating with and separated from the knives or bits, substantially as and for the purpose herein described.

6. A bark-mill comprising the two-part hinged cylindrical shell or casing A, having an open bottom, $a$, the rotating open-ended hollow drum or cutter-head C, having the adjustable knives or bits E on its periphery, the alternating angled or sloping ejector-wings F, separated from the knives, as described, and the vertically-adjustable hopper B, let into the casing at one side of its vertical center, and having its lower wall projecting within at $b$ in relation with the knives or bits, substantially as herein described.

In witness whereof I have hereunto set my hand.

WILLIAM A. WOODS.

Witnesses:
E. SPALSBURY,
BART BURKE.